April 28, 1959 J. C. COPELAND 2,883,908
REFLECTING AND MAGNIFYING VIEWER
Filed June 20, 1957 2 Sheets-Sheet 1
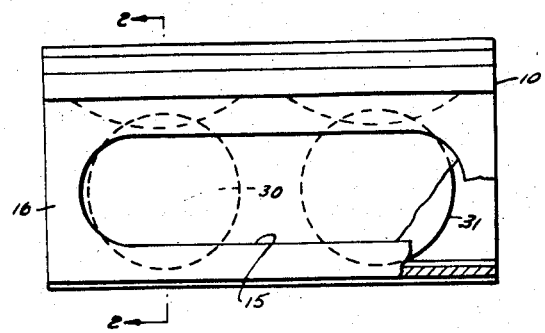
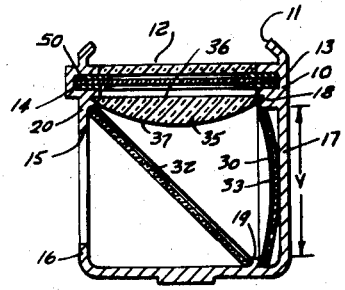
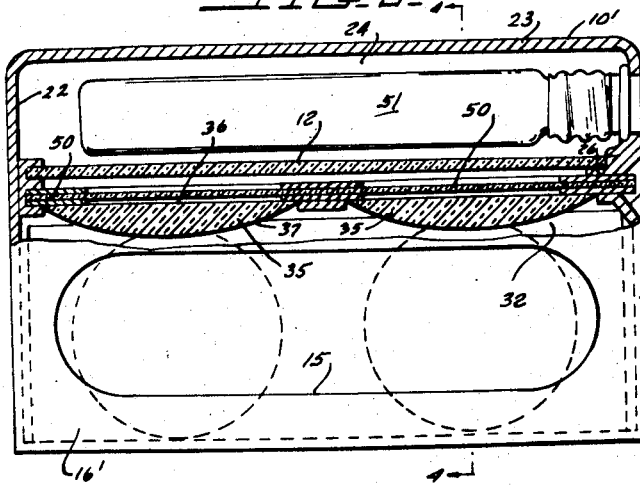
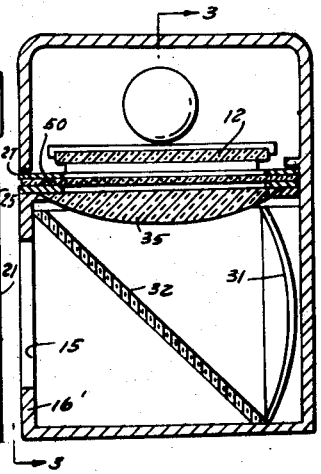
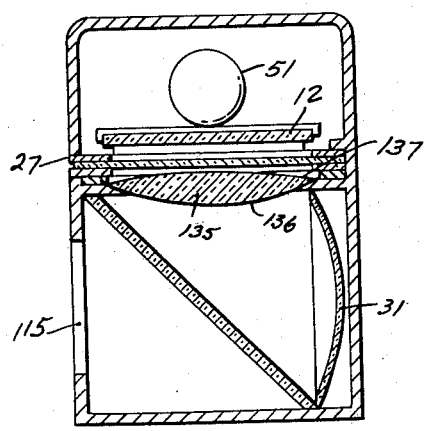
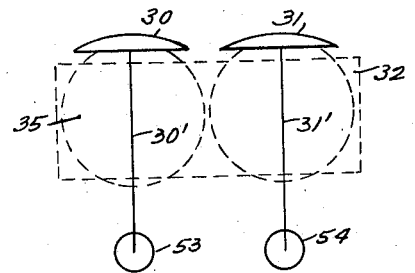
INVENTOR.
JACOB C. COPELAND
BY Greene, Pinckes & Dunn
ATTORNEYS

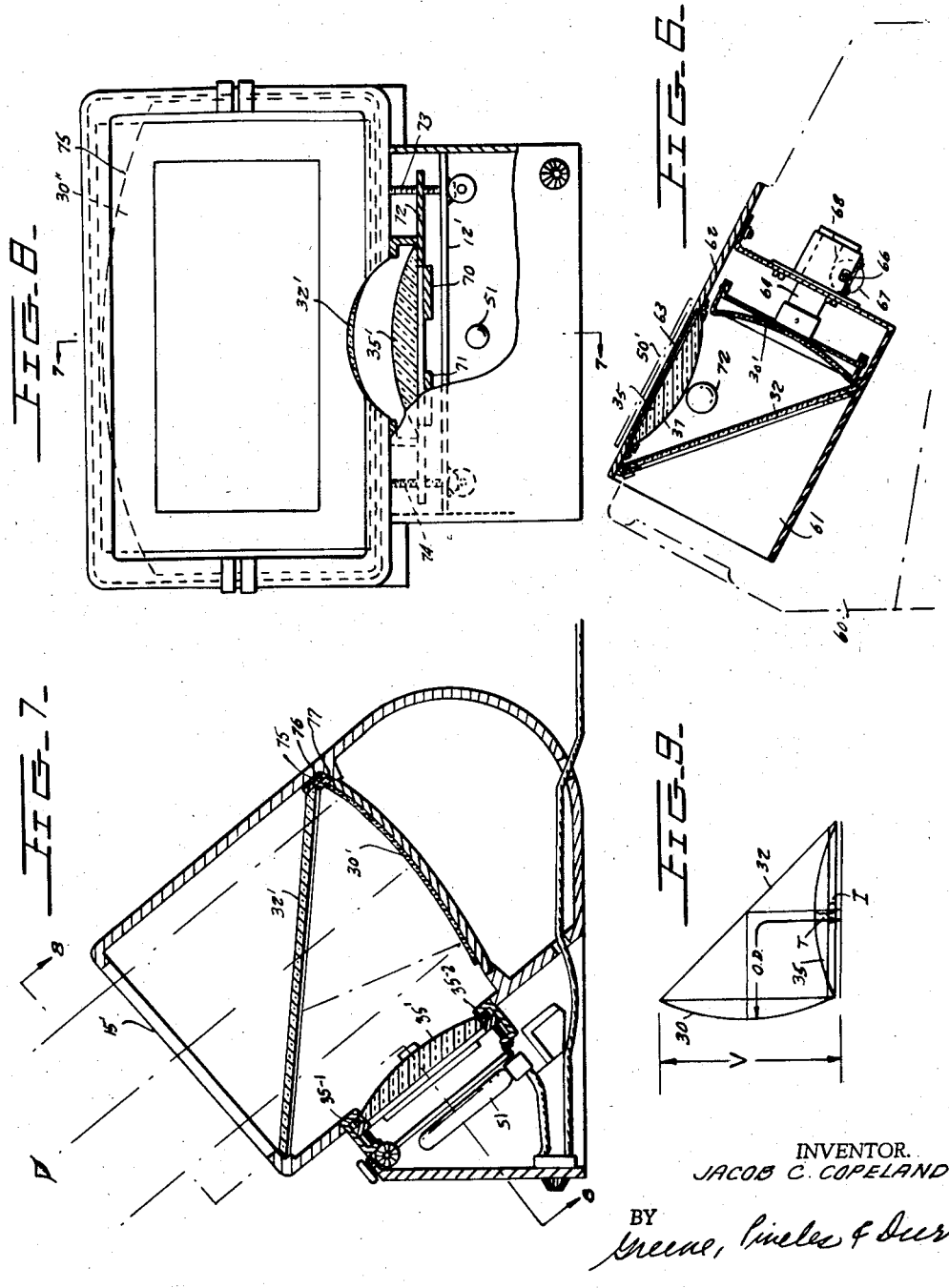

United States Patent Office 2,883,908
Patented Apr. 28, 1959

2,883,908

REFLECTING AND MAGNIFYING VIEWER

Jacob C. Copeland, Chicago, Ill.

Application June 20, 1957, Serial No. 666,889

1 Claim. (Cl. 88—29)

This invention relates to an improved viewing device for viewing transparencies or opaque pictures or slides, which viewing device is of the reflection type.

This application is a continuation-in-part of application Serial No. 376,377 filed August 25, 1953, and now abandoned, which in turn is a continuation-in-part of application Serial No. 123,996, filed October 28, 1949, now Patent No. 2,698,553, which in turn is a continuation-in-part of U.S. applications Serial No. 428,487, filed January 28, 1942, now abandoned, and Serial No. 660,129, filed April 6, 1946, now Patent No. 2,581,000. In Patent No. 2,698,553, a viewing device comprising a housing containing a concave mirror and a semi-transparent mirror at an angle of approximately 45° to the concave mirror is disclosed.

A picture holding means is located in said housing so that light from the picture is transmitted by the semi-transparent mirror to the concave mirror and back through the semi-transparent mirror and a viewing aperture in the housing. Certain critical dimensions for the height of the concave mirror with respect to the focal length thereof are disclosed. There is also disclosed one means of flattening the field of the observed magnified image to a certain degree (in one direction) by bending the picture to be viewed along the arc of a circle.

Application Serial No. 376,377 provides an improvement on the viewing device of the patent by adding a plano-convex lens as a field flattening means that does not otherwise affect the picture or object being viewed. The plano-convex lens is inserted with the plane side thereof facing the object to be viewed and right at the object plane thereof. It has now been found that it is not essential that the field flattening lens be a plano-convex one, but that it can be replaced with some advantages by an asymmetric double convex lens provided the side of the double convex lens which is adjacent the object plane has a relatively low curvature which is less than the curvature of the opposite side of said lens. The effect obtained by a double convex lens is an improvement over the effect obtained by a plano convex lens especially where the system is used binocularly in such a way that each eye obtains an off-axial view.

Among the objects of this invention, therefore, is to provide an improved viewer including spherical concave mirrors of relatively high magnification together with improved field flattening means.

These and other objects of the invention are accomplished by providing a viewer with a housing containing therein, a view locating means, a substantially rectangular semi-transparent mirror the top edge of which is substantially at the plane of the view locating means and the sides of which extend at an angle of approximately 45° to the plane of the view locating means, a concave spherical mirror located in the space between the view locating plane and the bottom edge of the semi-transparent mirror, a viewing aperture and at least one plano-convex lens or an asymmetric double convex lens located with the plane of the flatter side thereof adjacent the object plane and the more convex side thereof extending toward the semi-transparent mirror. A plano convex lens may be considered as a limiting case of an asymmetric double convex lens wherein the flatter face has a radius approaching infinity.

In selecting the concave mirror or mirrors certain critical limitations have to be observed. In said Patent No. 2,698,553, when one edge of the semi-transparent mirror is substantially flush with the viewing aperture and the opposite edge is substantially in contact with the spherical concave mirror, then the focal length F of the concave mirror and the distance V between the contacting edge of of the semi-transparent mirror and the plane of the viewing aperture must be such that the ratio of $V/F$ is equal to or less than 0.94. With the lens device of this invention added the distance V is further shortened a distance equal to approximately ⅓ of the lens thickness at its thickest part. Thus, the ratio of $V/F$ must be less than approximately 0.90. There is no true lower limit to this ratio but from a practical standpoint the lower limit is around 0.6 since with smaller ratios the vertical field is rather limited.

The viewer may have the view locating means or object plane at the top of the device or the view locating means may be at the bottom of the device in which case the top and bottom of the semi-transparent mirror would be reversed. The view locating means or object plane may also be at one side of the device.

The foregoing and other objects of the invention will be best understood from the following description of exemplifications of the same when read in connection with the accompanying drawing in which:

Fig. 1 is a front view partly broken away of one form of a binocular viewer made according to the invention.

Fig. 2 is a side cross sectional view taken on line 2—2 of Fig. 1.

Fig. 3 is a front cross section view taken on line 3—3 of Fig. 4 of a modified form of binocular viewer similar to Figs. 1 and 2 but on an enlarged scale.

Fig. 4 is a side cross sectional view similar to Fig. 2, taken on line 4—4 of Fig. 3.

Fig. 5 is a diagrammatic view illustrating the optical system of Figs. 1–4.

Fig. 6 is a side cross sectional view of a modified form of viewer with a focusing system.

Fig. 7 is a side cross sectional view of another modified form of the device.

Fig. 8 is a front view partially broken away (along line 8—8 of Fig. 7) of the device of Fig. 7.

Fig. 9 is a diagrammatic view illustrating the limitations of the system employed in the viewers of Figs. 1–3.

Fig. 10 is a view similar to Fig. 6 but showing a modified type of field flattener.

Figs. 1–5 show devices employing two matched concave mirrors one for each eye whereas Figs. 6–8 show devices employing only one concave mirror but to be used monocularly or binocularly. The device of Figs. 1–5 is used specifically for the viewing of pairs of stereoptic pictures binocularly.

In the device of Figs. 1 and 2 external lighting is employed which may be the sun or artificial illumination. The housing 10 has an opening 11 at the top to admit light from an external source and a light diffusing means 12 such as a frosted glass plate adjacent said opening 11. The means for holding and positioning the picture or slide 50 comprises the pair of slots 13, 14 on opposite sides of the top portions. The slide 50 is admitted from one end of the device. The ends may be left open as shown in Fig. 1 but it is often desirable to close the ends (as shown in Fig. 3). However, in using the device the ends may be closed with the hands. The device of Figs. 1 and 2 is shown in its simplest form without internal illuminating means and without ends. The housing 10 may be made by a continuous extrusion process from metals or plastics; after extrusion the extruded housing is cut off to the desired size and the opening 15 is formed in the front wall 16. Where the viewers are to be used for display purposes the housing may be made long enough to accommodate a plurality of viewers, openings 15 being cut along the length thereof. The openings 15 are slightly greater than the pupillary distance of the human eyes.

Inside the rear wall 17 a pair of concave mirrors 30 and 31 are mounted so as to be opposite the respective sides of the openings 15. These concave mirrors 30 and 31 as spaced from each other so that the axes thereof are parallel but spaced a distance equivalent to the average pupillary distance for humans. The mirrors 30 and 31 are supported between the longitudinal internal ribs 18 and 19 of the housing. Extending between the rib 19 and the corner 20 is a half-silvered mirror 32. This mirror 32 extends at an angle of approximately 45° with respect to both the picture holding plane or picture 50 and the plane of mirrors 30, 31. The mirrors 30, 31 have a front surface semi-reflecting coating 33 thereon which is sufficiently dense so as to eliminate ghost images due to reflection from the second surface.

A lens 35 which is shown as a plano convex lens but which may be an asymmetric biconvex lens, is fixed in the housing with the flatter side 36 thereof adjacent the plane of the picture holding means (defined by the slots 13 and 14) and with the greater convex side extending toward said semi-transparent mirror 32. Without the lens 35 the device acts to magnify and reflect the image of the picture 50 towards the viewing aperture 15. Such a reflecting device is substantially free of chromatic aberration and other aberrations normally associated with refracting systems but suffers from curvature of field and distortion. The lens 35 alleviates the aberrations of curvature of field and distortion both when used axially and off-axially.

The device shown in Figs. 3 and 4 is substantially the same as that of Figs. 1 and 2 except that the housing 10' contains a top wall 23 enclosing a chamber 24 in which a lamp bulb 51 is located. The housing 10' also includes end walls 21 and 22 and the end wall 21 includes a slot 26 for admitting the pictures to be viewed and a depressed area 25 which allows a small portion of the picture mounting to protrude. A slot 27 may also be formed in the front wall 16' (see Fig. 4) for introducing the picture mounting from the front. Like numbers refer to like parts throughout the specification.

Fig. 5 shows the optical system of Figs. 1–4 as it is used. The left eye 53 of the viewer is approximately on the imaginary axis 30' of mirror 30 whereas the right eye 54 is approximately on the imaginary axis 31' of mirror 31. In binocular viewers a septum is usually provided at 52 so that the right eye does not see the image meant for the left eye and vice versa. However, with the system of this invention no septum is necessary since the right eye cannot receive any substantial amount of light from mirror 30. The axes 30' and 31' are spaced approximately the pupillary distance or about 60–70 mm.

The broad idea of adding a plano-convex lens to an optical system for reducing curvature of field and distortion has already been suggested for uniaxial systems in connection with precision optical instruments such as in Schmidt optical systems for the Schmidt camera. For complete correction of the curvature of field, it has been suggested that the radius of the convex side of the lens should approximate about ⅓ of the focal length of the system. In such systems, the primary function of the plano convex lens is to completely correct for curvature of field for a coaxial arrangement of the optical system and the photographic plate.

In the devices of Figs. 1–5 the viewer is a biaxial one, yet each eye is positioned for viewing approximately on the axis of one of the two optical systems, as illustrated in Fig. 5. An unexpected feature of the present invention is that the field flattening effect of the asymmetric lens is unusually well adapted for binocular viewing devices such as illustrated in Figs. 6–8 where each eye is off-axis with respect to the optical system. In this case the function of the field flattener is somewhat different than when used on-axis. Thus, in systems such as shown in Figs. 6–8, the field flattener modifies the distortions produced by the off-axis viewing so that when viewed binocularly the effect of flatness is obtained. This results because of a minimizing of the disparity of the right and left eye distortions. The off-axis viewing produces what may be called a "psychological" curvature of field due to disparities produced by distortions and is different from "physical" curvature. The latter curvature can be measured by physical means whereas the psychological curvature (in this case) is an effect which takes place when the brain attempts to blend or fuse two off-axis images distorted in opposite directions.

The devices of Figs. 6–8 relate to single concave mirror systems. The device of Fig. 6 is for viewing opaque objects 50'. In this form of the invention the illumination is from the inside, a shaded bulb 72 on one or both sides being provided to throw light onto the object 50' but not directly onto the mirror 32 or 30'. In this form of the device the plano-convex lens may have a non-reflecting coating to cut down reflection from the surfaces thereof although for the most part reflections from the convex surface 37 do not interfere. The housing 61 of this viewer comprises top plate 62 adapted to hold a frosted glass plate 63 and the plano-convex lens 35. The spherical mirror 30' is adjustably mounted for movement toward or away from the diagonal mirror 32 so that the device can be adjusted to accommodate or alleviate discomfort of observers having such ocular muscle anomalies as esophoria (tendency inward) and exophoria (tendency outward) and also to adjust its focus for high myopes. The mirror 30' is held in position by shaft 64 which is movable inwardly or outwardly by a gear system 66, 67, 68.

In cases where very large spherical mirrors are employed as in Figs. 7 and 8 the lens 35' may be cut across its top and bottom sides 35–1 and 35–2 to fit it into the device. In this form the lens 35' as well as the picture holding means 70, 71 is mounted on a frame 72 which is adjustable by means of rotatable screws 73, 74 to change the optical distance between the picture and the spherical mirror to alleviate discomfort of observers with esophoria or exophoria. In order to permit the diagonal mirror 32' to come as close as possible to the spherical mirror 30'' the top edge 75 of the said spherical mirror is curved. As shown in Fig. 7 the top edge 75 of mirror 30'' is substantially in contact with the adjacent edge of diagonal mirror 32 but actual contact is prevented by gaskets 76, 77.

The critical dimensions for the focal length and vertical dimension of the spherical mirror in the system with the asymmetric bi-convex field flattener are still as essential in these devices as in the devices without the said field flattener although changed slightly by the said flattener. As illustrated in Fig. 9, when the top edge of the spherical mirror 30 just touches the top edge of the diagonal mirror 32 at the central points of said top edges, then the vertical dimension V of the spherical mirror must be equal to or less than 0.94 times the focal length of the mirror minus ⅓ the distance T which is the thickness of the lens 35. If the spherical mirror does not have a curved top edge as shown in Fig. 8 for example but instead has a substantially straight top edge then the vertical height V thereof must be reduced accordingly. If the plane I of the picture to be viewed is lowered still more then also the dimension V of the spherical mirror must be reduced accordingly. These limitations are necessary to bring the optical distance O.D. of Fig. 9 at or within the focal distance of the said spherical mirror. A very satisfactory value for $V/F$ is 0.5 to 0.90.

Fig. 10 shows the improved form of asymmetric bi-convex lens field flattener 135 having a face 137 facing the object 27 of relatively low curvature (i.e., having a large radius of curvature). The opposite face 136 has a smaller radius of curvature. The compensations made in the optical system as a result of the addition of the asymmetric bi-convex lens are similar to those discussed above for the plano-convex lens. A very satisfactory lens 135 which makes the field appear absolutely flat binocularly has the following characteristics. The radii of the two convex surfaces are in the approximate proportions of between 4.5:1 to 6:1 and the focal length of the lens is approximately equal to the focal length of the concave mirror 31. For example, for a system with a concave mirror 31 having a focal length of 72 mm., a lens 135 having a radius of 48 mm. on one side and a radius of 265 mm. on the other and having a focal length of 73 mm., makes the field appear completely flat, when viewed binocularly.

The features and principles underlying the invention described above in connection with specific exemplifications will suggest to those skilled in the art many other modifications thereof. It is accordingly desired that the appended claim shall not be limited to any specific feature or details shown and described in connection with the exemplifications thereof.

I claim:

In a magnifying reflecting viewing device, the combination comprising a housing, positioning means associated with said housing for positioning a flat object to be viewed in a predetermined positioning plane, a semi-transparent diagonal mirror mounted within said housing so as to extend over a flat object which is positioned for viewing in said positioning plane, said semi-transparent mirror extending at an angle of approximately 45° with respect to said positioning plane, a single concave mirror positioned to receive light reflected by said semi-transparent mirror from the flat object held in said positioning plane, the plane of said concave mirror being at an angle of approximately 90° with respect to said positioning plane and at an angle of approximately 45° with respect to said semi-transparent mirror, a viewing aperture in said housing opposite the concave mirror, the width of said viewing aperture being greater than its height so as to simultaneously accommodate both eyes of a viewer with the axis of said concave mirror extending through the center portion of said aperture so that each eye sees an off-axis image of the object; an asymmetric bi-convex lens overlying said positioning plane having its more convex side facing said semi-transparent mirror, the ratio of the radius of curvature of the less convex side to that of the more convex side of said lens being in the range from about 4.5:1 to about 6:1 for suppressing field curvature and distortion of the object when seen binocularly through said viewing aperture.

References Cited in the file of this patent

UNITED STATES PATENTS

| | | |
|---|---|---|
| 2,229,302 | Martin et al. | Jan. 21, 1941 |
| 2,490,747 | Creighton | Dec. 6, 1949 |
| 2,590,657 | Shepard | Mar. 25, 1952 |
| 2,619,872 | Shepard | Dec. 2, 1952 |

FOREIGN PATENTS

| | | |
|---|---|---|
| 242,881 | Switzerland | Nov. 16, 1946 |
| 544,694 | Great Britain | Apr. 23, 1942 |
| 875,974 | France | July 13, 1942 |